United States Patent
Yoshida

(10) Patent No.: US 10,144,482 B2
(45) Date of Patent: Dec. 4, 2018

(54) SHOCK ABSORBER

(71) Applicant: Showa Corporation, Gyoda-shi (JP)

(72) Inventor: Kojiro Yoshida, Fukuroi (JP)

(73) Assignee: SHOWA CORPORATION, Gyoda-Shi (JP)

(*) Notice: Subject to any disclaimer, the term of this patent is extended or adjusted under 35 U.S.C. 154(b) by 0 days.

(21) Appl. No.: 15/415,375

(22) Filed: Jan. 25, 2017

(65) Prior Publication Data
US 2017/0282992 A1 Oct. 5, 2017

(30) Foreign Application Priority Data

Mar. 31, 2016 (JP) .................. 2016-072266

(51) Int. Cl.
| B62K 25/08 | (2006.01) |
| F16F 13/00 | (2006.01) |
| F16F 15/023 | (2006.01) |
| F16F 15/067 | (2006.01) |
| F16F 9/02 | (2006.01) |
| F16F 9/06 | (2006.01) |
| B62K 25/04 | (2006.01) |

(52) U.S. Cl.
CPC ............ *B62K 25/08* (2013.01); *F16F 9/0218* (2013.01); *F16F 9/065* (2013.01); *F16F 9/067* (2013.01); *F16F 13/002* (2013.01); *F16F 15/0232* (2013.01); *F16F 15/067* (2013.01); *B62K 2025/044* (2013.01); *B62K 2025/048* (2013.01); *B62K 2201/08* (2013.01); *F16F 9/02* (2013.01)

(58) Field of Classification Search
CPC ...... F16F 9/062; F16F 13/002; F16F 15/0232; F16F 15/067; B62K 25/08; B62K 2025/044; B62K 2025/048; B62K 2201/08
USPC ......... 188/314; 267/64.11, 64.15, 64.26, 195
See application file for complete search history.

(56) References Cited

U.S. PATENT DOCUMENTS 6,213,261 B1 * 4/2001 Kunkel .............. B60G 17/0416
188/284

FOREIGN PATENT DOCUMENTS

| DE | 19801055 C | 4/1999 |
| FR | 1054308 A | 2/1954 |
| JP | 2014-77452 A | 5/2014 |
| SU | 848801 A | 7/1981 |

OTHER PUBLICATIONS

Extended European Search Report dated Sep. 8, 2017 for the corresponding European Patent Application No. 17153438.1.

* cited by examiner

Primary Examiner — Thomas W Irvin
(74) Attorney, Agent, or Firm — Leason Ellis LLP

(57) ABSTRACT

A front fork leg includes an inner chamber that absorbs by a gas spring a shock caused on a vehicle; an auxiliary gas spring chamber communicating with the inner chamber; an auxiliary piston provided in the auxiliary gas spring chamber; and a gas spring chamber side gas chamber sectioned by the auxiliary piston and communicating with the inner chamber, and the auxiliary piston moves to increase a volume of the gas spring chamber side gas chamber, as pressure inside the inner chamber increases.

19 Claims, 7 Drawing Sheets

SHOCK ABSORBER

CROSS-REFERENCE TO RELATED APPLICATIONS

The present application claims priority under 35 U.S.C. § 119 to Japanese Patent Application No. 2016-072266, filed Mar. 31, 2016. The contents of this application are incorporated herein by reference in their entirety.

BACKGROUND

Field

The present disclosure relates to a shock absorber, and more particularly to a shock absorber which absorbs shocks a vehicle receives from a road surface.

Related Art

A shock absorber provided with a gas spring chamber having a function of a gas spring is known as a shock absorber for absorbing shocks a vehicle receive from a road surface. For example, Japanese Patent Application Publication No. 2014-77452 (published on May 1, 2014) discloses a suspension device provided with a hydraulic shock absorber, and an air spring which urges this hydraulic shock absorber in an extension direction at all times, and the air spring comprises gas which is sealed inside an air chamber of which the volume expands and contracts with extension and compression of the hydraulic shock absorber.

The suspension device is provided with volume expansion means which expands volume of the air chamber in accordance with increase in an amount of the compression of the hydraulic shock absorber. More specifically, the volume expansion means is provided with an auxiliary chamber which is formed inside a sub-cylinder, and a movable partition wall which partitions the sub-cylinder into the air chamber and the auxiliary chamber and slides along an inner circumferential surface of the sub-cylinder.

The movable partition wall moves to an auxiliary chamber side when the amount of the compression of the hydraulic shock absorber has become equal to or greater than a prescribed amount.

SUMMARY

In the invention disclosed in Japanese Patent Application Publication No. 2014-77452, the volume of the air chamber expands due to the movable partition wall moving to the auxiliary chamber side, when reaction force in the air chamber (air reaction force) exceeds a prescribed value in accordance with increase in the amount of the compression of the hydraulic shock absorber. By this configuration, the air reaction force is prevented from becoming excessively large in the latter half of a compression stroke.

The air reaction force in the gas spring shows a quadratic increase in response to the stroke of the shock absorber. Therefore, even in the case of the invention in Japanese Patent Application Publication No. 2014-77452, the more the compression stroke of the shock absorber proceeds, the larger the reaction force the rider receives from the vehicle becomes. In a shock absorber of this kind also, it is difficult to set the characteristics of increase of the air reaction force to desired characteristics, for example, linearly increasing characteristics.

The present disclosure was devised in view of the above-mentioned problem, and object thereof being to provide a shock absorber which is capable of obtaining desired reaction force characteristics in accordance with the stroke of the main body of the shock absorber.

In order to solve the problem described above, the shock absorber according to the present disclosure includes: a shock absorber main body which absorbs a shock input to a vehicle; a gas spring chamber which is provided inside the shock absorber main body, and inside which gas is sealed, and moreover which absorbs the shock by a gas spring that is based on the gas; an auxiliary gas spring chamber, inside which the gas is sealed, and which communicates with the gas spring chamber and moreover which is formed in a cylindrical shape; a movable partition wall which is provided slidably in an axial direction inside the auxiliary gas spring chamber; a gas spring chamber side gas chamber which is sectioned by the movable partition wall inside the auxiliary gas spring chamber and which is communicates with the gas spring chamber; and an elastic body side gas chamber which is sectioned by the movable partition wall in the auxiliary gas spring chamber, and which is formed on an opposite side of the movable partition wall to the gas spring chamber side gas chamber, and moreover which has an elastic body having a prescribed modulus of elasticity that urges the partition wall towards the gas spring chamber side gas chamber. The partition wall moves towards the elastic body side gas chamber in such a manner that a volume of the gas spring chamber side gas chamber increases, as air pressure inside the gas spring chamber increases.

According to the shock absorber according to the present disclosure, it is possible to obtain desired reaction force characteristics in accordance with the stroke of the shock absorber main body.

DESCRIPTION OF EMBODIMENTS

First Embodiment (1-1. Overall Configuration of Front Fork 4)

Figure 1A:
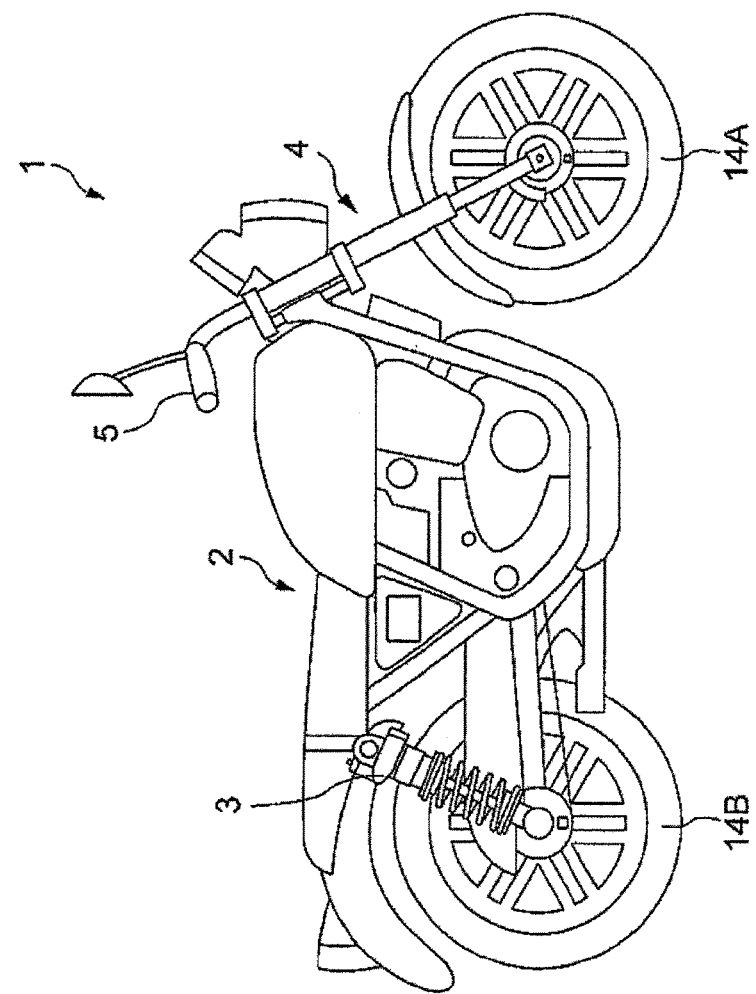
FIG. 1A is a drawing showing a configuration of a motorcycle in which a front fork having a first front fork leg according to the first embodiment is mounted.
Figure 1B:
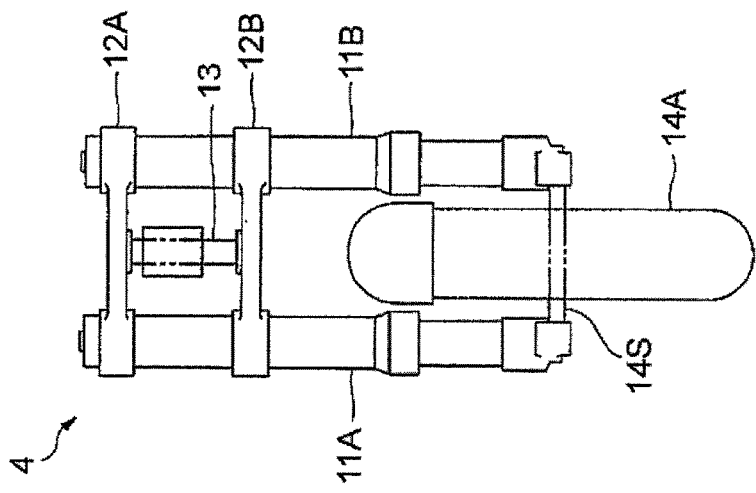
FIG. 1B is a drawing showing the configuration of the front fork.

FIG. 1A is a drawing showing a configuration of a motorcycle (vehicle) 1 in which a front fork (shock absorber) 4 having a first front leg (shock absorber main body) 11A according to the first embodiment is mounted. Furthermore, FIG. 1B is a drawing showing a configuration of the front fork 4.

The motorcycle 1 shown in FIG. 1A is provided with a vehicle body 2, a front wheel 14A, which is a vehicle wheel disposed to a front of the vehicle body 2, a rear wheel 14B which is a vehicle wheel disposed to a rear of the vehicle body 2, a rear suspension 3 which connects the vehicle body 2 and the rear wheel 14B, a front fork 4 which connects the vehicle body 2 and the front wheel 14A, and a handle bar 5 for steering the motorcycle 1.

The front fork 4, for example, connects the front wheel 14A to the vehicle body 2 of a two-wheeler, or three-wheeler, etc. and transmits the steering of the handlebar 5 to the front wheel 14A, as well as absorbing shocks. In the present embodiment, as shown in FIG. 1B, the front fork 4 includes the first front fork leg (shock absorber main body) 11A, a second front fork leg 11B, a first bracket 12A, a second bracket 12B and a steering shaft 13.

The first front fork leg 11A and the second front fork leg 11B are disposed to the left and right of the front wheel 14A, so as to oppose each other via the front wheel 14A, and support the front wheel 14A rotatably via an axle 14S. Furthermore, the first front fork leg 11A and the second front fork leg 11B are configured so as to be extendible and compressible in an axial direction. In the present embodiment, the lengthwise direction of the first front fork leg 11A is called an "axial direction" in the explanation given below.

The first front fork leg 11A is configured as an air suspension which creates a main shock-absorbing action by gas sealed in the interior thereof. In the present embodiment, the first front fork leg 11A is not provided with a damping mechanism. The details of the first front fork leg 11A are described hereinafter.

The second front fork leg 11B is provided internally with a damping mechanism, such as an oil damper. A configuration of the second front fork leg 11B is not limited to this, and may adopt a similar configuration to the first front fork leg 11A, for example.

A first bracket 12A and a second bracket 12B connect the first front fork leg 11A and the second front fork leg 11B. Two ends of the steering shaft 13 are connected respectively to the first bracket 12A and the second bracket 12B. The front fork 4 are connected steerably (rotatably) to the vehicle body 2, by connecting the steering shaft 13 to the vehicle body 2.

(1-2. Configuration of First Front Fork Leg 11A)
(1-2-1. Basic Configuration)

Figure 2:
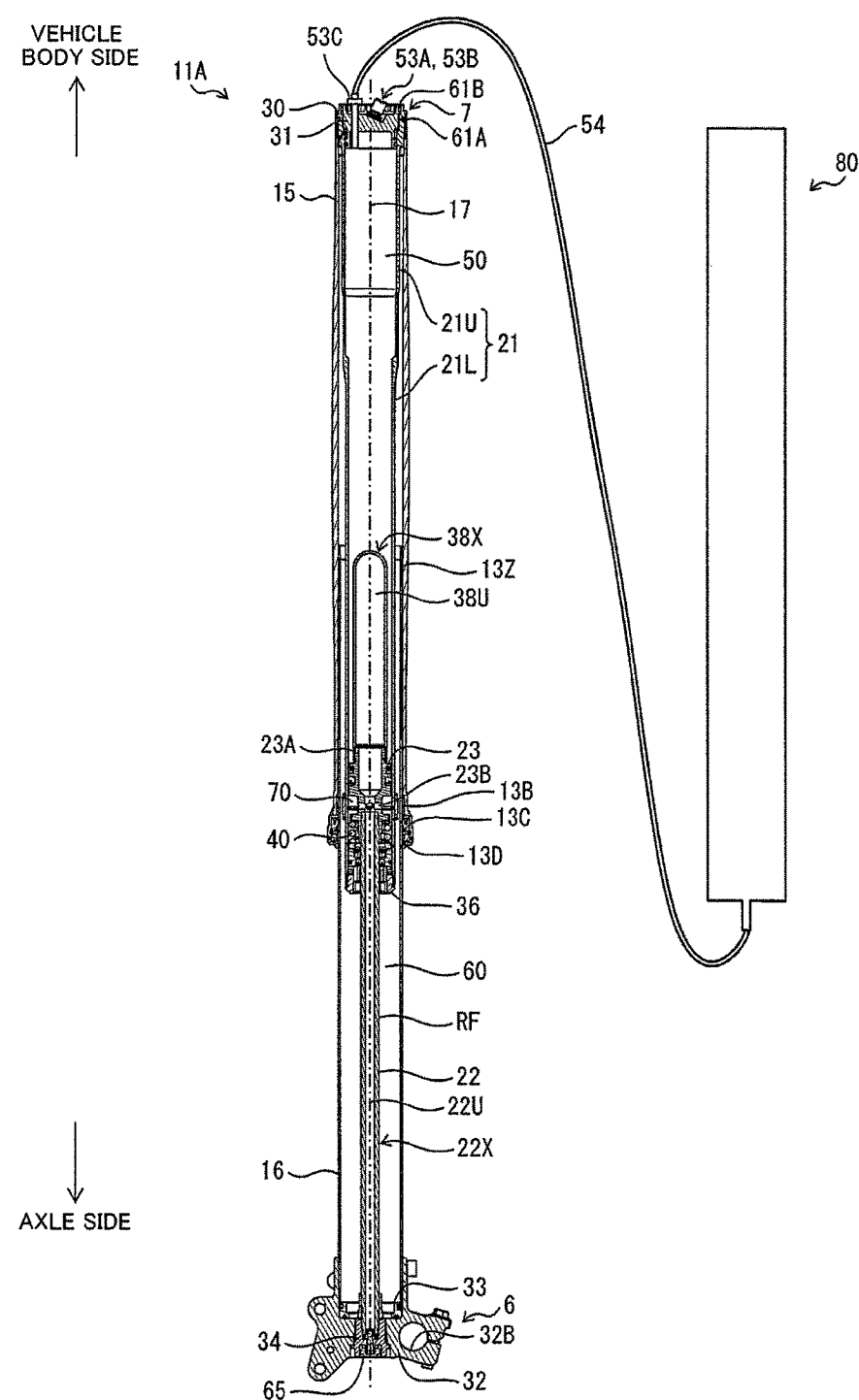
FIG. 2 is a cross-sectional view showing an extended state of the first front fork leg provided in the front fork.
Figure 3:
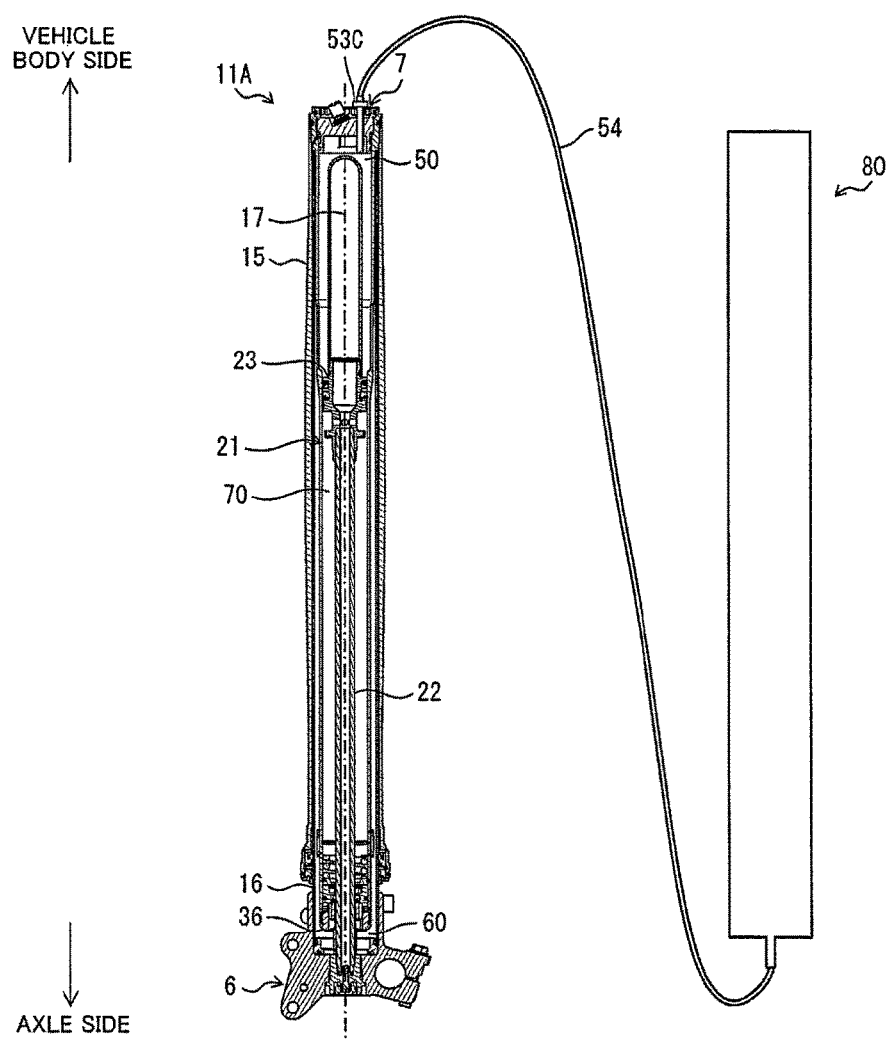
FIG. 3 is a cross-sectional view showing a compressed state of the first front fork leg.

FIG. 2 is a cross-sectional view showing an extended state of the first front fork leg 11A which is provided in the front fork 4. FIG. 3 is a cross-sectional view showing a compressed state of the first front fork leg 11A.

As shown in FIGS. 2 and 3, the first front fork leg 11A includes an axle side fixing section 6, a vehicle body side fixing section 7, an outer tube 15, an inner tube 16, a cylinder 21, a rod 22, a piston 23, a rod guide 36, and a plurality of air spring chambers (an inner chamber 50 (gas spring chamber), an outer chamber 60 and a balance chamber 70).

The first front fork leg 11A absorbs shocks input to the motorcycle 1. Furthermore, an auxiliary gas spring chamber 80 is connected to the first front fork leg 11A. In the present embodiment, the auxiliary gas spring chamber 80 is provided on the outside of the first front fork leg 11A. The front fork 4 also includes a hose 54 (tubular member) which connects the first front fork leg 11A with the auxiliary gas spring chamber 80.

In the first front fork leg 11A, for example, the axle side fixing section 6 is connected to an axle side of the motorcycle 1, and furthermore, the vehicle body side fixing section 7 is connected to a frame, etc. which is the vehicle body side of the motorcycle 1, the rod 22 is provided in the axle side fixing section 6, and the cylinder 21 is provided in the vehicle body side fixing section 7, thereby configuring the front fork 4 in which the rod 22 is positioned to a lower side and the cylinder 21 is positioned to an upper side.

The axle side fixing section 6 includes a bracket 32, a bottom piece 33 and a bottom bolt 34. The bottom piece 33 is attached to an axle side opening of the inner tube 16 so as to seal the opening. The bracket 32 is provided with a connection hole 32B for connecting the axle.

A pressure adjustment section 65 which communicates with an internal space of the rod 22 is provided in the bottom bolt 34. By this pressure adjustment section 65, it is possible to prevent outflow of the gas to the outside from the internal space of the rod 22, as well as being able to adjust a compression ratio of the gas inside the balance chamber 70 via a first gas chamber 22U inside the rod 22.

The vehicle body side fixing section 7 is constituted by a cap 30 and a bolt section 31 which close off the outer tube 15 and a vehicle body side opening of the cylinder 21 in an airtight state. The vehicle body side fixing section 7 is provided on the vehicle body side by means of the first front fork leg 11A being connected to the vehicle body of the motorcycle 1 via the first bracket 12A, the second bracket 12B and the steering shaft 13, for example. In the vehicle body side fixing section 7, the airtight state is maintained between the outside, and an interior of the outer tube 15 and an interior of the cylinder 21, by seal members 61A, 61B, etc., which are O rings, for example.

An inner chamber pressure adjustment section 53A for adjusting a sealing pressure in the inner chamber 50, an outer chamber pressure adjustment section 53B for adjusting a sealing pressure in the outer chamber 60, and a connection valve 53C to which the hose 54 is connected are provided in the bolt section 31.

The inner tube 16 is a cylindrical member, of which an axle side is fixed to the axle side fixing section 6 in such a manner that the axle side opening is sealed. The outer tube 15 is also a cylindrical member, to a vehicle body side of which the vehicle body side fixing section 7 is fixed in such a manner that a vehicle body side opening is sealed. A vehicle body side end of the inner tube 16 is inserted inside the outer tube 15 via an axle side opening of the outer tube 15.

A seal member 13C and a dust seal 13D are provided on an inner circumferential surface on the axle opening side of the outer tube 15, a bush 13B is provided on an inner circumferential surface of the outer tube 15, and a bush 13Z is provided on the outer circumferential surface on the vehicle body side end of the inner tube 16. The outer circumferential surface of the inner tube 16 and the inner circumferential surface of the outer tube 15 are configured so as to be capable of sliding movement while maintaining the airtight state, via the bushes 13Z, 13B, the seal member 13C and the dust seal 13D.

The inner tube 16 and the outer tube 15 are configured so as to be capable of relative movement along a central axis 17 of the inner tube 16 and the outer tube 15. The axle side fixing section 6 and the vehicle body side fixing section 7 move towards each other during a compression stroke, and move away from each other during an extension stroke.

Furthermore, the first front fork leg 11A further includes, on an inside of the outer tube 15 and the inner tube 16, the cylinder 21 which is formed in a cylindrical shape with a smaller diameter than an inner diameter of a tube of the inner tube 16, and a rod 22 which is formed in the cylindrical shape with a smaller diameter than an inner diameter of a tube of the cylinder 21.

An axle side of the rod 22 is fixed to the axle side fixing section 6 in such a manner that an axle side opening of the rod 22 is in a sealed state, and furthermore a vehicle body side of the cylinder 21 is fixed to the vehicle body side fixing section 7 in such a manner that the vehicle body side opening of the cylinder 21 is in a sealed state.

The cylinder 21 is formed by connecting an axle side cylinder 21L and a vehicle body side cylinder 21U. The rod guide 36 having a rod penetrating hole 36*h* (see FIG. 4) is provided in an axle side opening of the axle side cylinder 21L. The bush 37 (see FIG. 4) is provided in an inner circumferential surface of the rod penetrating hole 36*h*, and an outer circumferential surface RF of the rod 22 and the inner circumferential surface of the bush 37 are configured in a slidable fashion. A vehicle body side of the rod 22 is inserted inside the cylinder 21 via the rod penetrating hole 36*h*.

Figure 4:
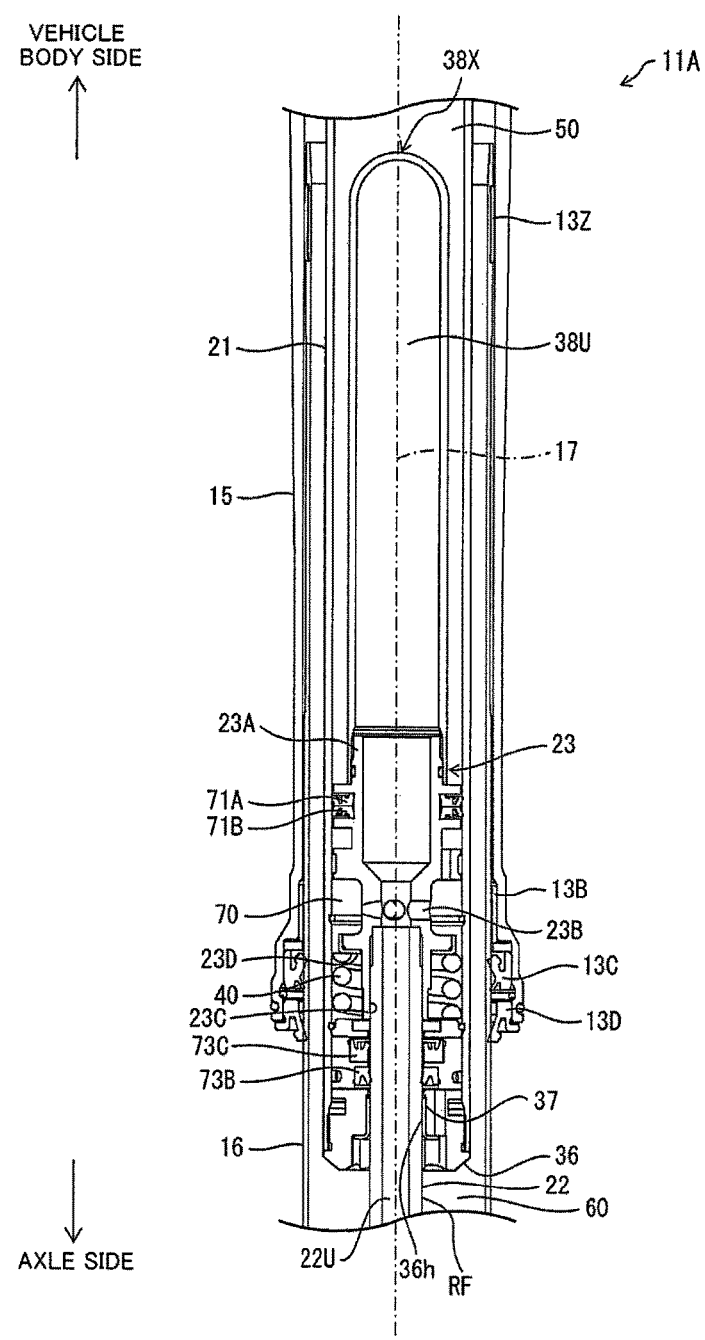
FIG. 4 is an enlarged cross-sectional view of a periphery of a piston which is provided in the first front fork leg shown in FIG. 2.

FIG. 4 is an enlarged cross-sectional view of the periphery of the piston 23 which is provided on the first front fork leg 11A shown in FIG. 2. The piston 23 is provided on a vehicle body side end of the rod 22 which is inserted inside the cylinder 21. A rebound spring 40 is provided between an axle side of the piston 23 and a vehicle body side of the rod guide 36. The rebound spring 40 extends in a spiral shape along the central axis 17 of the rod 22, on an outer side of the outer circumferential surface RF of the rod 22.

An insertion hole 23C for inserting one end of the rod 22 is formed on the axle side of the piston 23. An outer circumferential surface of a portion forming the insertion hole 23C is inserted into a spiral center hole of the rebound spring 40 from an opening of the center hole, and furthermore a spring impact surface 23D, which is a surface which extends in a radial direction from the outer circumferential surface, is formed on a vehicle body side of the outer circumferential surface of the portion forming the insertion hole 23C. An extension operation exceeding a prescribed amount is prevented by one end of the rebound spring 40 impacting against the spring impact surface 23D.

The outer tube 15, the inner tube 16, the cylinder 21, the rod 22 and the piston 23 are provided so as to be respectively coaxial with the central axis 17.

A sub-tank connection section 23A which connects with a second sub-tank 38X is formed on a vehicle body side of the piston 23. The sub-tank connection section 23A is formed as a cylindrical section with a smaller diameter than a diameter of an outer circumferential surface of the piston 23. The second sub-tank 38X is formed by a hollow rod-shaped container, of which one end is open and the other end is closed.

A communication passage 23B for communicating with a second gas chamber 38U in the second sub-tank 38X and the first gas chamber 22U on an inside of the rod 22, to the balance chamber 70, is formed inside the piston 23. In this way, since the second sub-tank 38X communicating with the balance chamber 70 is provided, then volume of the balance chamber 70 can be expanded, and the compression ratio can be lowered even under high-pressure condition. Therefore, the reaction force characteristics in the case of maximum extension are stabilized, and steering stability can be improved.

(1-2-2 Configuration of First Gas Chamber 22U and Second Gas Chamber 38U)

As shown in FIGS. 2 and 3, an inside of the first front fork leg 11A is divided into the inner chamber 50, which is a first air spring chamber, the outer chamber 60, which is a second air spring chamber, and a balance chamber 70, which is a third air spring chamber. As shown in FIG. 4, rib packings 71A, 71B for maintaining the balance chamber 70 and the inner chamber 50 which are mutually adjacent in the airtight state, and rib packings 73B, 73C for maintaining the balance chamber 70 and the outer chamber 60 which are mutually adjacent in the airtight state, are provided.

The inner chamber 50 is formed by a sealed space enclosed between the vehicle body side fixing section 7, the piston 23, an inner circumferential surface of the cylinder 21 between the vehicle body side fixing section 7 and the piston 23, and an outer circumferential surface of the second sub-tank 38X.

The outer chamber 60 is formed by a sealed space enclosed by the outer circumferential surface RF of the rod 22, the axle side fixing section 6, the inner circumferential surface of the inner tube 16 and the outer tube 15, the vehicle body side fixing section 7, the outer circumferential surface of the cylinder 21, and an axle side end of the rod guide 36.

The balance chamber 70 is formed by a space enclosed by the piston 23, the rod guide 36, and an inner circumferential surface of the cylinder 21 between the piston 23 and the rod guide 36.

The first gas chamber 22U on the inside of the rod 22 communicates with the balance chamber 70 via the communication passage 23B formed in the piston 23, and the rod 22 functions as a first sub-tank 22X which forms the first gas chamber 22U for adjustment of the compression ratio of the gas inside the balance chamber 70.

Furthermore, the second sub-tank 38X communicates with the balance chamber 70 via a communication passage 23B formed in the piston 23, as well as communicates with the first gas chamber 22U of the rod 22, and forms a second gas chamber 38U for the adjustment of the compression ratio of the gas inside the balance chamber 70.

As described above, the first front fork leg 11A has a structure in which the outer tube 15 is provided on the vehicle body side and the inner tube 16 is provided on the axle side. However, the first front fork leg 11A may also have a structure in which the outer tube 15 is provided on the axle side and the inner tube 16 is provided on the vehicle body side.

(1-2-3 Configuration of Auxiliary Gas Spring Chamber 80)

Figure 5:
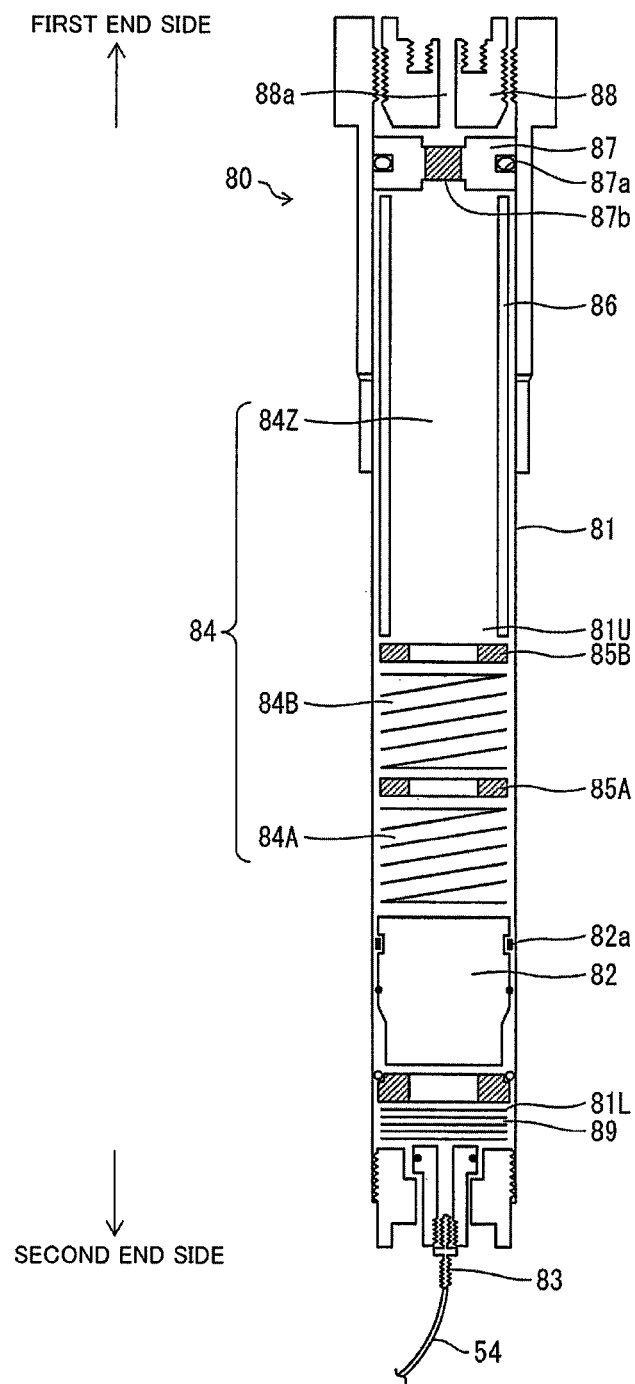
FIG. 5 is a cross-sectional view showing a configuration of an auxiliary gas spring chamber.

FIG. 5 is a cross-sectional view showing a configuration of the auxiliary gas spring chamber 80. As shown in FIG. 5, the auxiliary gas spring chamber 80 is provided with an auxiliary cylinder 81, an auxiliary piston 82 (movable partition wall), a connection valve 83, a first spring (metal spring, elastic body) 84A, a first washer 85A, a second spring (metal spring, elastic body) 84B, a second washer 85B, an auxiliary tube 86, a gas spring adjustment section 87, an auxiliary cap 88 and a shim 89. In the description given below, a side of the auxiliary cap 88 in the auxiliary gas spring chamber 80 is called a first end side, and a side of the connection valve 83 is called a second end side.

The auxiliary cylinder 81 is a cylindrical member which defines an outer shape of the auxiliary gas spring chamber 80. The auxiliary piston 82 is provided slidably in the axial direction inside the auxiliary cylinder 81. A seal member 82*a* is provided on an outer circumferential surface of the auxiliary piston 82. The outer circumferential surface of the auxiliary piston 82 slides in an airtight fashion with respect to an inner circumferential surface of the auxiliary cylinder 81, by means of the seal member 82*a*.

The auxiliary cylinder 81 is provided with a gas spring chamber side gas chamber 81L and an elastic body side gas chamber 81U, which are divided by the auxiliary piston 82. The gas spring chamber side gas chamber 81L communicates with the inner chamber 50 via the hose 54. The elastic body side gas chamber 81U is formed on the first end side with respect to the auxiliary piston 82 and has, therein, an elastic body having a prescribed modulus of elasticity which urges the auxiliary piston 82 towards the gas spring chamber side gas chamber 81L.

The connection valve 83 is provided on an end of the second end side of the auxiliary cylinder 81. The hose 54 is connected to the connection valve 83, and the gas spring chamber side gas chamber 81L communicates with the inner chamber 50 via the hose 54.

The first spring 84A, the first washer 85A, the second spring 84B, the second washer 85B, the auxiliary tube 86 and the gas spring adjustment section 87 are arranged in the elastic body side gas chamber 81U, in the stated order from the second end side. A first end side surface of the auxiliary piston 82 and a second end side surface of the first washer 85A function as a spring bearing for the first spring 84A. Furthermore, a first end side surface of the first washer 85A and a second end side surface of the second washer 85B function as a spring bearing for the second spring 84B.

The auxiliary tube 86 is a cylindrical member having an outer diameter that is smaller than an inner diameter of the auxiliary cylinder 81. The auxiliary tube 86 defines an initial load (preset) of the first spring 84A and the second spring 84B. The auxiliary tube 86 can also be omitted.

The gas spring adjustment section 87 is a member which defines the first end side end section of the elastic body side gas chamber 81U. An auxiliary seal member 87a is provided on an outer circumferential surface of the gas spring adjustment section 87 which faces an inner circumferential surface of the auxiliary cylinder 81. The gas spring adjustment section 87 is provided so as to be slidable while maintaining the airtight state with respect to the inner circumferential surface of the auxiliary cylinder 81, by the auxiliary seal member 87a. The air filled into the elastic body side gas chamber 81U constitutes a gas spring (elastic body) 84Z. The gas spring 84Z is a spring based on the gas filled into the elastic body side gas chamber 81U, and the gas in the space where the first spring 84A and the second spring 84B are arranged also constitutes the gas spring 84Z. A valve 87b for adjusting an amount of the air sealed in the elastic body side gas chamber 81U is provided in the center of the gas spring adjustment section 87.

The auxiliary cap 88 is a member for preventing the gas spring adjustment section 87 from falling off the auxiliary cylinder 81. A through hole 88a which passes from the first end side surface to the second end side surface is formed in the auxiliary cap 88. The through hole 88a opens into the gas spring adjustment section 87 on the second end side surface of the auxiliary cap 88. By introducing an air injection needle into the valve 87b via the through hole 88a, it is possible to inject the air into the elastic body side gas chamber 81U, or to discharge the air from the elastic body side gas chamber 81U.

Mutually engaging screw grooves are formed in the inner circumferential surface of the auxiliary cylinder 81 and a surface of the auxiliary cap 88 facing the same. It is possible to move the auxiliary cap 88 and the gas spring adjustment section 87 in an axial direction of the auxiliary cylinder 81, by rotating the auxiliary cap 88 with respect to the auxiliary cylinder 81, about an axis of the auxiliary cylinder 81.

The auxiliary piston 82 is urged towards the gas spring chamber side gas chamber 81L by the first spring 84A, the second spring 84B and the gas spring 84Z. The initial load of the first spring 84A and the second spring 84B is adjusted by rotating the auxiliary cap 88 with respect to the auxiliary cylinder 81 and thereby moving the same in the axial direction of the auxiliary cylinder 81, or by changing a length of the auxiliary tube 86. Magnitude of a force from the gas spring 84Z which urges the auxiliary piston 82 is adjusted by the amount of the air filled into the elastic body side gas chamber 81U.

The moduli of elasticity of the first spring 84A, the second spring 84B and the gas spring 84Z are $k1$, $k2$, $kz$. In this case, a combined modulus of elasticity $kg$ of the elastic body inside the elastic body side gas chamber 81U is $kg=k1 \times k2 \times kz/(k1+k2+kz)$.

In the description given below, a force urging the auxiliary piston 82 caused by the first spring 84A, the second spring 84B and the gas spring 84Z is referred to as an "urging force by the composite spring 84".

A plurality of ring-shaped shims 89 are inserted inside the gas spring chamber side gas chamber 81L. The auxiliary piston 82 cannot move towards the second end side beyond the uppermost shim of the plurality of the ring-shaped shims 89.

(1-3. Operation of First Front Fork Leg 11A)

As the vehicle body receives a shock, the first front fork leg 11A absorbs the shock by performing a compressing operation (compression stroke) wherein the inner tube 16 and the outer tube 15 move towards each other, and an extension operation (extension stroke) wherein the inner tube 16 and the outer tube 15 move away from each other.

In the compression stroke, a reaction force urging the inner tube 16 and the outer tube 15 to move away from each other is generated due to the gas inside the inner chamber 50 and the outer chamber 60 being compressed as the volume of the inner chamber 50 and the outer chamber 60 becomes smaller.

Furthermore, if a pressure inside the inner chamber 50 and the gas spring chamber side gas chamber 81L becomes greater than the urging force of the composite spring 84, then the auxiliary piston 82 moves to the first end side (the side of the elastic body side gas chamber 81U), and volume of the gas spring chamber side gas chamber 81L increases. Consequently, increase in the pressure inside the inner chamber 50 and inside the gas spring chamber side gas chamber 81L is suppressed. The auxiliary piston 82 stops moving at a position where the pressure inside the inner chamber 50 and inside the gas spring chamber side gas chamber 81L and the urging force of the composite spring 84 become equal to each other.

Furthermore, in the extension stroke, since the piston 23 and the rod guide 36 move towards each other, then the volume of the balance chamber 70, which is a rebound air spring chamber, becomes smaller, and the gas inside the balance chamber 70 is compressed. In this case, the gas sealed inside the balance chamber 70, and inside the first sub-tank 22X configured by the rod 22 which communicates with the balance chamber 70, and inside the second sub-tank 38X in the cylinder 21, acts as an air spring, and generates a reaction force in a direction that compresses the front fork 4.

In this case, due the increase in the volume of the inner chamber 50, the pressure inside the inner chamber 50 and inside the gas spring chamber side gas chamber 81L becomes smaller than the urging force of the composite spring 84. Therefore, the auxiliary piston 82 moves towards the side of the gas spring chamber side gas chamber 81L, and the volume of the gas spring chamber side gas chamber 81L decreases. The auxiliary piston 82 stops moving upon contact with the shims 89.

(1-4. Air Reaction Force Characteristics of First Front Fork Leg 11A)

Figure 6:
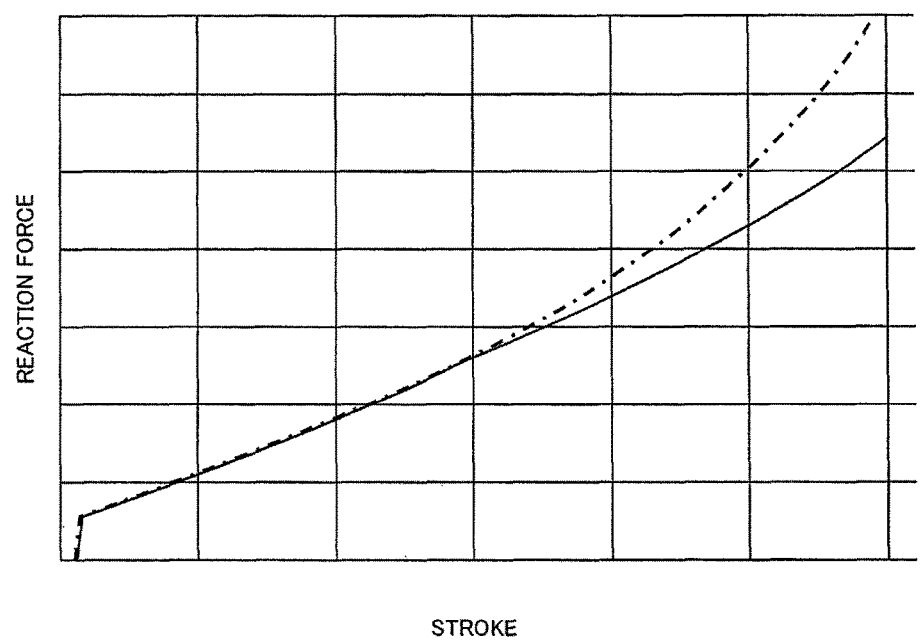
FIG. 6 is a graph showing air reaction force characteristics of the first front fork leg.

FIG. 6 is a graph showing the air reaction force characteristics of the first front fork leg 11A. In the graph shown in FIG. 6, the horizontal axis represents a stroke of the first front fork leg 11A and the vertical axis represents the reaction force of the first front fork 11A.

In the case of a front fork leg that does not have the auxiliary gas spring chamber 80, the reaction force increases suddenly in a latter half of the stroke (in other words, the latter half of the compression stroke), as indicted by a single-dotted line in FIG. 6. Therefore, riding comfort of the motorcycle 1 becomes worse in the latter half of the compression stroke.

On the other hand, in the case of the first front fork leg 11A according to the present embodiment, the increase in the reaction force in the latter half of the stroke is gentle compared to a front fork leg which does not have an auxiliary gas spring chamber 80, as indicated by a solid line in FIG. 6. More specifically, the reaction force characteristics in the compression stroke of the first front fork leg 11A are closed to so-called linearly increasing characteristics.

(1-5. Effects of Front Fork 4)

The first front fork leg 11A is configured as an air suspension. In a conventional air suspension, the reaction force in the compression stroke shows quadratic increase with respect to the stroke. Therefore, the more the compression stroke of the air suspension progresses, the larger the reaction force that the rider on the motorcycle 1 receives from the vehicle becomes, and thus the rider feels uncomfortable.

The first front fork leg 11A according to the present embodiment has the auxiliary piston 82 which is slidable and which moves such that the volume of the gas spring chamber side gas chamber 81L which communicates with the inner chamber 50 becomes larger when the pressure in the inner chamber 50 has become greater than a prescribed pressure. By adjusting the modulus of elasticity of the elastic body which urges the auxiliary piston 82 towards the elastic body side gas chamber 81U, the characteristics of increase of the air reaction force of the shock absorber with respect to the stroke of the piston 23 can be set to desired increase characteristics, for example, linearly increasing characteristics.

Furthermore, in the present embodiment, the elastic body provided in the elastic body side gas chamber 81U has the gas spring 84Z, and the first spring 84A and the second spring 84B, which are metal springs. Consequently, the characteristics of increase in the reaction force of the first front fork leg 11A can be set on the basis of the combined modulus of elasticity of the gas spring and the metal springs.

Furthermore, in the present embodiment, the elastic body of the elastic body side gas chamber 81U has a plurality of metal springs, namely, the first spring 84A and the second spring 84B, and therefore the reaction force can be set to a broader range than when the elastic body has a single metal spring.

In the example described above, the first spring 84A and the second spring 84B are arranged in series. However, in the auxiliary gas spring chamber 80 relating to the present embodiment, the first spring 84A and the second spring 84B may be arranged in parallel.

Furthermore, in the present embodiment, the auxiliary gas spring chamber 80 is provided on the outside of the first front fork leg 11A. Consequently, a shape of the auxiliary gas spring chamber 80 is not restricted by a shape of the front fork 11A, and a freedom of layout of the front fork 4 is improved.

Moreover, in the front fork 4 relating to the present embodiment, the inner chamber 50 and the auxiliary gas spring chamber 80 are connected by the hose 54. Therefore, it is possible to alter a positional relationship between the first front fork leg 11A and the front fork 4, and the freedom of the layout of the front fork 4 is further improved.

Moreover, in the front fork 4 according to the present embodiment, the main shock absorbing action is produced by the gas which is sealed in the first front fork leg 11A. Therefore, by providing the auxiliary gas spring chamber 80, it is possible to set the air reaction force of the first front fork leg 11A to a suitable value.

Second Embodiment

Further embodiments of the present disclosure are described below with reference to FIG. 7. A third front fork leg 11C (shock absorber main body) according to the present embodiment has the same configuration as the first front fork leg 11A, except for the fact that the connection valve 53C and the second sub-tank 38X are not provided therein, but an auxiliary gas spring chamber 90 is provided therein.

Figure 7:
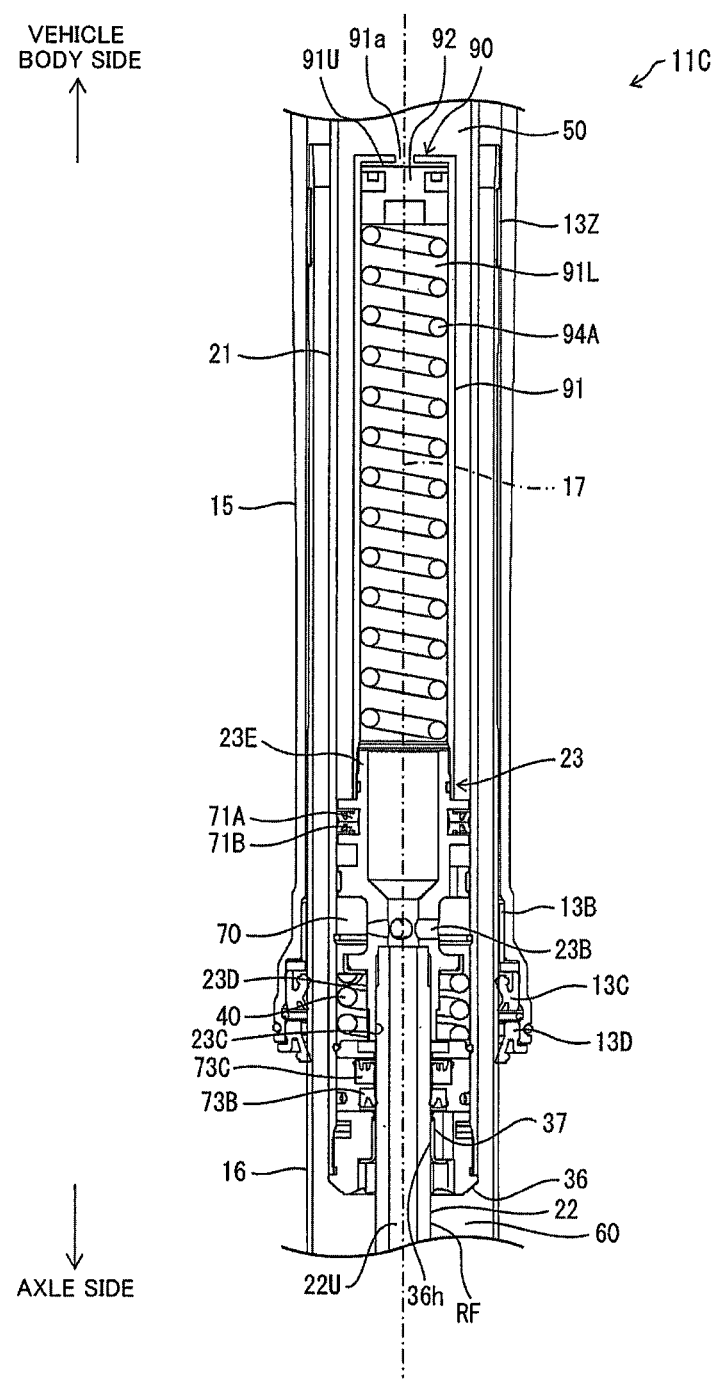
FIG. 7 is an enlarged cross-sectional view of a periphery of an auxiliary gas spring chamber which is provided in a third front fork leg according to a second embodiment.

FIG. 7 is an enlarged cross-sectional drawing of the periphery of an auxiliary gas spring chamber 90 provided in the third front fork leg 11C. As shown in FIG. 7, the auxiliary gas spring chamber 90 is provided with an auxiliary cylinder 91, a diaphragm 92 (movable partition wall) and a metal spring 94A.

The auxiliary cylinder 91 is a cylindrical member which has a diameter smaller than the cylinder 21 and which is provided coaxially with the outer tube 15, the inner tube 16 and the cylinder 21. The auxiliary cylinder 91 is fixed to the auxiliary cylinder connection section 23E, which is the inner chamber 50 side end section of the piston 23 that forms one portion of the inner chamber 50. A hole section 91a is provided in a vehicle body side end section of the auxiliary cylinder 91.

The diaphragm 92 is a partition wall which slides along an inner circumferential surface of the auxiliary cylinder 91. The auxiliary gas spring chamber 90 is provided with a diaphragm 92 to partition the auxiliary cylinder 91 into a gas spring chamber side gas chamber 91U which is connected to the inner chamber 50, and an elastic body side gas chamber 91L which is formed at a position further toward the axle side than the diaphragm 92 (on the opposite side to the gas spring chamber side gas chamber 91U) and which has an elastic body having a prescribed modulus of elasticity which urges the diaphragm 92 towards the vehicle body side (the gas spring chamber side gas chamber 91U). The elastic body side gas chamber 91L communicates with the balance chamber 70 via a connection passage 23B which is formed inside the piston 23. Therefore, the elastic body side gas chamber 91L functions as a gas chamber for the adjustment of the compression ratio of the gas inside the balance chamber 70. The first gas chamber 22U inside the rod 22 also communicate with the balance chamber 70 via the communication passage 23B, and therefore the communication passage 23B connects both the elastic body side gas chamber 91L and the first gas chamber 22U, to the balance chamber 70.

The metal spring 94A is provided inside the elastic body side gas chamber 91L, and urges the diaphragm 92 towards the vehicle body side. Furthermore, gas at a prescribed pressure is sealed inside the elastic body side gas chamber 91L, and this gas acts as a gas spring and urges the diaphragm 92 towards the vehicle body side.

When a pressure inside the inner chamber 50 is small, then volume of the gas spring chamber side gas chamber 91U is virtually zero. As the pressure inside the inner chamber 50 is large, the diaphragm 92 is pressed towards the axle side by this pressure, and the volume of the gas spring chamber side gas chamber 91U is increased. As a result of this, increase in the pressure inside the inner chamber 50 is suppressed, and therefore increase in the reaction force of the third front fork leg 11C is suppressed.

As the pressure in the inner chamber 50 becomes large and the diaphragm 92 moves towards the axle side, volume of the elastic body side gas chamber 91L decreases and a pressure inside the elastic body side gas chamber 91L increases. However, as described above, since the elastic body side gas chamber 91L communicates with the balance chamber 70, the abovementioned increase in the pressure is suppressed. Consequently, the diaphragm 92 moves more readily towards the axle side when the pressure inside the inner chamber 50 increases, and the volume of the gas spring chamber side gas chamber 91U increases more readily.

The elastic body side gas chamber 91L is not necessarily connected to the balance chamber 70 via the connection passage 23B. Even if the elastic body side gas chamber 91L and the balance chamber 70 are not connected, an effect described above of suppressing increase in the reaction force of the third front fork leg 11C is obtained. Furthermore, similarly to the first embodiment, a further metal spring may be arranged in series, or in parallel, with the metal spring 94A, in the elastic body side gas chamber 91L.

In the present embodiment, the auxiliary gas spring chamber 90 is provided inside the third front fork leg 11C. In this case, the layout of the front fork 4 can be made more compact.

The present disclosure is not limited to the embodiments described above, and various modifications may be made within a scope of claims as stated, and embodiments obtained by suitably combining technical means disclosed respectively in different embodiments are also included in a technical scope of the present disclosure.

REFERENCE SIGNS LIST

4: Front fork (shock absorber), 11A: First front fork leg (shock absorber main body), 11C: Third front fork leg (shock absorber main body), 23: Piston, 50: Inner chamber (gas spring chamber), 54: Hose (tubular member), 80, 90: Auxiliary gas spring chamber, 81L, 91U: Gas spring chamber side gas chamber, 81U, 91L: Elastic body side gas chamber, 82: Auxiliary piston (movable partition wall), 84A: First spring (metal spring), 84B: Second spring (metal spring), 84Z: Gas spring, 92: Diaphragm (movable partition wall), 94A: Metal spring

What is claimed is:

1. A shock absorber, comprising:
    a shock absorber main body that absorbs a shock input to a vehicle;
    a gas spring chamber which is provided inside the shock absorber main body, and inside which gas is sealed, and which absorbs the shock by a gas spring that is based on the gas;
    an auxiliary gas spring chamber, inside which the gas is sealed, and which communicates with the gas spring chamber, and which is formed in a cylindrical shape;
    a movable partition wall which is provided slidably in an axial direction inside the auxiliary gas spring chamber;
    a gas spring chamber side gas chamber which is sectioned by the movable partition wall in the auxiliary gas spring chamber and which communicates with the gas spring chamber; and
    an elastic body side gas chamber which is sectioned by the movable partition wall in the auxiliary gas spring chamber, and which is formed on an opposite side of the movable partition wall to the gas spring chamber side gas chamber, and which has an elastic body having a prescribed modulus of elasticity that urges the movable partition wall towards the gas spring chamber side gas chamber, wherein
    the movable partition wall moves towards the elastic body side gas chamber so as to increase a volume of the gas spring chamber side gas chamber, as pressure inside the gas spring chamber increases.

2. The shock absorber according to claim 1, wherein the elastic body of the elastic body side gas chamber has a gas spring that is based on the gas sealed therein, and a metal spring.

3. The shock absorber according to claim 2, wherein the elastic body has a plurality of metal springs.

4. The shock absorber according to claim 3, wherein the auxiliary gas spring chamber is provided outside the shock absorber main body.

5. The shock absorber according to claim 4, further comprising a tubular member which connects the gas spring chamber and the auxiliary gas spring chamber.

6. The shock absorber according to claim 3, further comprising a piston which forms a portion of the gas spring chamber, wherein
    the auxiliary gas spring chamber is fixed to a gas spring chamber side end of the piston.

7. The shock absorber according to claim 2, wherein the auxiliary gas spring chamber is provided outside the shock absorber main body.

8. The shock absorber according to claim 7, further comprising a tubular member which connects the gas spring chamber and the auxiliary gas spring chamber.

9. The shock absorber according to claim 2, further comprising a piston which forms a portion of the gas spring chamber, wherein
    the auxiliary gas spring chamber is fixed to a gas spring chamber side end of the piston.

10. The shock absorber according to claim 2, wherein an auxiliary tube is provided in the elastic body side chamber to define an initial load of the metal spring.

11. The shock absorber according to claim 2, wherein
    the gas spring has a gas portion where the spring metal is not provided, and
    the metal spring is separated from the gas portion by a washer.

12. The shock absorber according to claim 1, wherein the elastic body has a plurality of metal springs.

13. The shock absorber according to claim 12, wherein the auxiliary gas spring chamber is provided outside the shock absorber main body.

14. The shock absorber according to claim 13, further comprising a tubular member which connects the gas spring chamber and the auxiliary gas spring chamber.

15. The shock absorber according to claim 12, further comprising a piston which forms a portion of the gas spring chamber, wherein
    the auxiliary gas spring chamber is fixed to a gas spring chamber side end of the piston.

16. The shock absorber according to claim 1, wherein the auxiliary gas spring chamber is provided outside the shock absorber main body.

17. The shock absorber according to claim 16, further comprising a tubular member which connects the gas spring chamber and the auxiliary gas spring chamber.

18. The shock absorber according to claim 1, further comprising a piston which forms a portion of the gas spring chamber, wherein the auxiliary gas spring chamber is fixed to a gas spring chamber side end of the piston.

19. The shock absorber according to claim 1, wherein the shock absorber main body is formed as an air suspension which produces a main shock absorbing action by using the gas sealed therein.

* * * * *